UNITED STATES PATENT OFFICE.

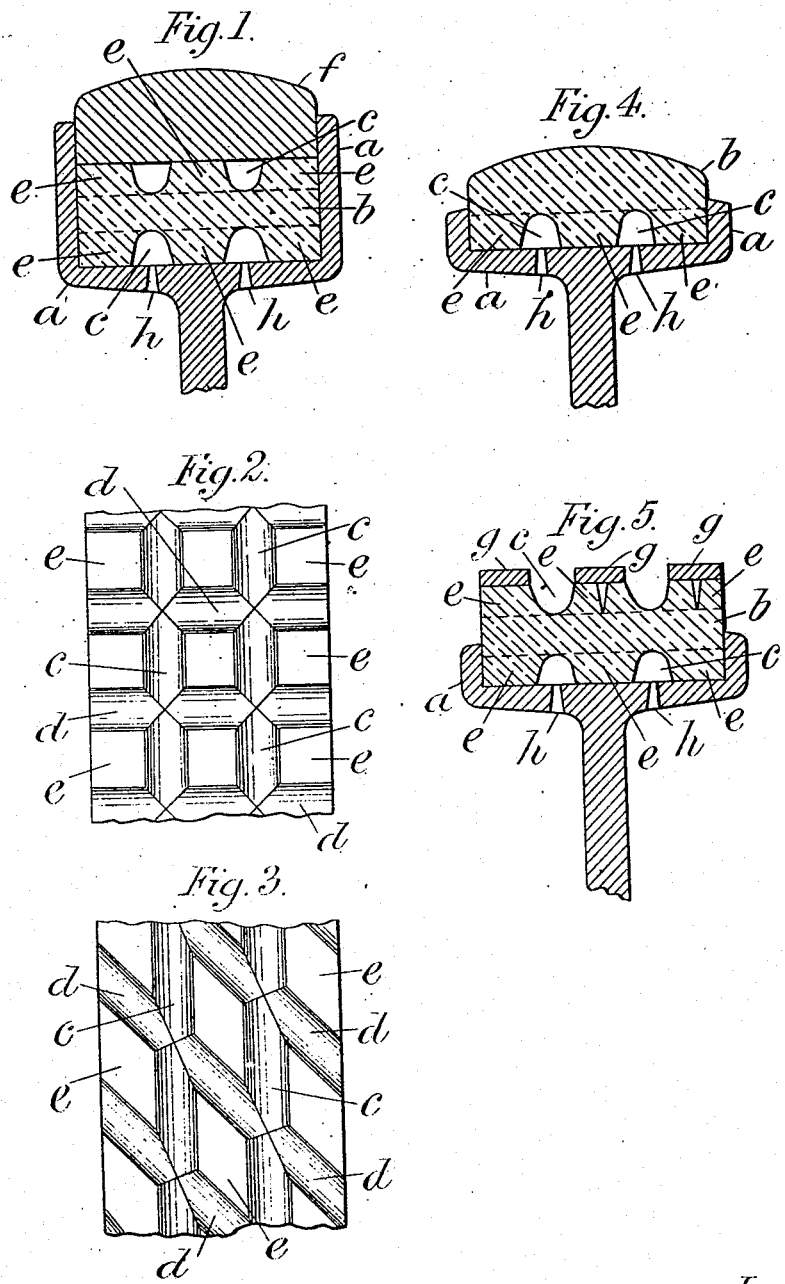

DAVID CYNRIG THOMAS, OF BRONWYDD, LLANISHEN, ENGLAND.

TIRE.

No. 836,286.    Specification of Letters Patent.    Patented Nov. 20, 1906.

Application filed November 23, 1905. Serial No. 288,789.

*To all whom it may concern:*

Be it known that I, DAVID CYNRIG THOMAS, hoisting engineer, a subject of the King of Great Britain, residing at Bronwydd, Llanishen, in the county of Glamorgan, England, have invented certain new and useful Improvements in Tires, of which the following is a specification.

This invention relates to improvements in tires; and its object is to provide a tire having great resilience without the necessity of a pneumatic tube with its attendant disadvantages.

According to this invention, a ring of india-rubber or other resilient material, which supports the tire or forms the tire itself, is provided with a series of grooves crossing one another in such a manner that one or both faces of the strip are divided up so as to leave a number of projecting studs separated by the grooves.

In order that my invention may be more clearly understood, I will describe it with reference to the accompanying drawings.

Figure 1 is a section of part of a wheel with the tire supported by a ring constructed in accordance with this invention. Fig. 2 is a plan of part of the ring shown in Fig. 1. Fig. 3 is a similar view showing a modification. Figs. 4 and 5 show parts of wheels in which the grooved ring itself forms the tire.

In Fig. 1, $a$ is the rim of the wheel. $b$ is the ring or inner tire, formed of india-rubber or other resilient material. In the inner and outer faces of the ring $b$ are longitudinal and transverse grooves $c\ d$, leaving the isolated projections $e$, as shown in Fig. 2. $f$ is the outer tire, which may be formed of solid rubber or of metal or other suitable substance. The ring $b$ and outer tire $f$ are placed on the rim of the wheel and retained there by any suitable known means. Instead of the longitudinal and transverse grooves $c$ and $d$, the grooves may be made obliquely, as shown at Fig. 3.

In Fig. 4 the ring $b$ itself forms the tire and is grooved on the inner face only, the outer face serving as the tread.

In Fig. 5 the ring is grooved on both faces, and the projections $e$ on the outer face may be shod with pieces of metal $g$.

In all cases holes $h$ are preferably provided in the rim of the wheel for the free outlet of the air in order that the projections $e$ may give freely under pressure.

The drawings show tires suitable for the wheels of motor-cars, but the tires are also applicable to the wheels of velocipedes and other vehicles, and the shape of the rims may also be varied in any desirable way.

What I claim is—

1. In a wheel, the combination with a rim, of a ring of resilient material lying in the rim and provided on both faces with longitudinal and transverse grooves lying in the same plane and of approximately the same depth, substantially as described.

2. In a wheel, the combination with a rim, of a ring of resilient material lying in the rim and provided with longitudinal and transverse grooves lying in the same plane and of approximately the same depth, and an outer tire surrounding the ring, substantially as described.

3. In a wheel, the combination with a rim, of a ring of resilient material lying in the rim and provided on both faces with longitudinal and transverse grooves of substantially the same depth and lying in the same plane, and an outer tire surrounding the ring, substantially as described.

4. In a wheel, the combination with a rim, pierced with holes, of a ring of resilient material lying in the rim and grooved with longitudinal and transverse grooves, substantially as described.

5. In a wheel, the combination with a rim, pierced with holes, of a ring of resilient material lying in the rim and grooved on both faces with longitudinal and transverse grooves, substantially as described.

6. In a wheel, the combination with a rim, pierced with holes, of a ring of resilient material lying in the rim and grooved with longitudinal and transverse grooves, and an outer tire surrounding the ring, substantially as described.

7. In a wheel, the combination with a rim, pierced with holes, of a ring of resilient material lying in the rim and grooved on both faces with longitudinal and transverse grooves, and an outer tire surrounding the ring, substantially as described.

DAVID CYNRIG THOMAS.

Witnesses:
  SAMUEL SHORE,
  ERNEST L. PHILLIPS.